United States Patent Office 3,536,734
Patented Oct. 27, 1970

3,536,734
PROCESS FOR THE PREPARATION OF POLYGLYCIDYL ETHERS
Geert C. Vegter and Feije H. Sinnema, Amsterdam, Netherlands, assignors to Shell Oil Company, New York, N.Y., a corporation of Delaware
No Drawing. Filed July 13, 1967, Ser. No. 653,026
Claims priority, application Netherlands, July 14, 1966, 6609886
Int. Cl. C07d 1/18
U.S. Cl. 260—348.6    4 Claims

ABSTRACT OF THE DISCLOSURE

New glycidyl ethers of polyhydric phenols derived from monohydric phenols and dicyclopentadiene are described. A process for preparing the new glycidyl ethers by reacting the phenols with epichlorohydrin is set out. A method for curing the new glycidyl ethers with curing agents, such as carboxylic acid anhydrides, to form products having attractive electrical properties is also described.

---

The invention relates to a process for the preparation of polyglycidyl ethers, which upon curing yield products with improved properties, in particular with attractive electrical properties but also with a good resistance to solvents and water and with a high deformation temperature.

Polyglycidyl ethers such as, for example, glycidyl ethers of 2,2-bis(4-hydroxyphenyl)propane, are used on a large scale in combination with various curing agents for the manufacture of castings, pressed insulating material and the like. In the event of high electric voltages leakage currents may arise at the surface of these materials, which apart from direct electrical losses may also cause a permanent loss of insulation owing to damage to the surface.

The invention provides a new type of polyglycidyl ether, from which cured products can be prepared with in particular improved electrical properties.

The process according to the invention for the preparation of polyglycidyl ethers by reaction of a polyphenol with epichlorohydrin in an alkaline medium is characterized in that the polyphenol employed is a compound with the general formula

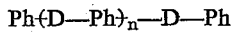

Ph$(D-Ph)_n$—D—Ph where $n$ represents a whole number between 0 and 3, Ph a phenylol radical derived from a mononuclear phenol and D is tricyclodecylene radical

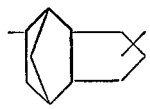

which may be methylated.

The polyphenols employed according to the invention are known as such, for example, from the French patent specification 1,364,247. According to this patent specification the polyphenols can be prepared by conversion of mono-nuclear phenols, which possess at least one free ortho- and/or para-position relative to a phenolic hydroxyl group, with a dicyclopentadiene. Suitable phenols for this conversion are, for instance, phenol, o-, m- and p-cresol, 3,4- and 3,5-dimethylphenol, the various alkyl phenols with in general not more than 15 carbon atoms per alkyl group, resorcinol, and mixtures of two or more phenols such as technical cresol. The use of phenol is preferred. The dicyclopentadiene component is preferably the unsubstituted dicyclopentadiene. If desired, however, this component may also consist of the dimer of methylcyclopentadiene or of a codimer of cyclopentadiene and methylcyclopentadiene.

The molar ratio in which the phenol and the dicyclopentadiene are caused to react may lie between 1.5:1 and 15:1, preferably between 4:1 and 10:1. Under the latter conditions the value of the number $n$ in the aforementioned formula will usually equal zero.

As a catalyst for this conversion a Friedel-Crafts catalyst may be used, such as, for example, $AlCl_3$, $AnCl_2$, $FeCl_3$, $SnCl_4$, in particular also $BF_3$ and coordination complexes thereof. The catalyst is employed in a quantity of from 0.2 to 40% by weight, preferably from 10 to 30% by weight, calculated on mono-nuclear phenol.

The most suitable reaction temperature depends on the catalyst used, and lies in general between $-20$ and $140°$ C. When a $BF_3$ catalyst is employed, reaction temperatures are preferably between $-15$ and $75°$ C. For the reaction to be completed it is desirable that after, for instance, ½ to 2 hours the reaction temperature be raised to $60-200°$ C. for some time.

The conversion may be caused to take place at atmospheric pressure. If solvents are employed with a relatively low boiling point, such as cyclohexane or toluene, the process will be conducted at elevated pressure. The conversion preferably takes place while excluding water and oxygen. It is desirable that the dicyclopentadiene be added to the catalyst-containing phenol.

The polyphenol thus obtained is preferably purified by washing with water or with alkali or acid, preceded or followed by distillation, if necessary.

In an alkaline medium the polyphenol obtained is etherified with epichlorohydrin to a polyglycidyl ether As a rule aqueous NaOH or KOH solutions are employed as an alkaline medium, in particular in 2 to 30% excess. The reaction temperature generally lies between 50 and $150°$ C., preferably between 100 and $120°$ C. The quantity of epichlorohydrin usually amounts to at least 1 mole, preferably to 3–15 moles per phenolic hydroxyl equivalent. If desired, an inert diluent, such as toluene, may be employed. In order to ensure a good contact between the reaction components it is desirable that the reaction mixture be stirred and/or boiled under reflux.

According to a suitable embodiment of the reaction, the aqueous alkaline solution is gradually added to a mixture brought to the appropriate reaction temperature, of the polyol and epichlorohydrin. In this embodiment it is ensured that the reaction mixture invariably contains approximately 0.3 to 2% by weight of water, which can be done by distilling off epichlorohydrin and water from the reaction mixture at a sufficient rate, by separating the condensate therefrom and recycling epichlorohydrin to the reaction mixture. As a rule, the process is operated with 5 to 12 mole of epichlorohydrin per phenolic hydroxyl equivalent and at an alkaline concentration of at least 15%, preferably from 20 to 45%. In general, a slight excess of alkaline solution, for example, 2 to 5%, is added. It is desirable that the excess of epichlorohydrin be distilled off before the equivalent quantity of alkaline solution has been added, for example, when 90 to 98% of this quantity has been added to the reaction mixture. The remainder of the alkaline solution is added to the reaction mixture, when the latter has been substantially freed from epichlorohydrin and, if desired, the salt formed has been filtered off or removed by centrifugation. After the reaction has been completed, a wash is carried out, as a rule with water or acidified water, while using benzene or toluene as a diluent, if desired. By distillation under reduced pressure the resultant polyglycidyl ether can subsequently be freed from water and diluent.

The preceding paragraph describes a preferred embodiment of the process according to the invention. Obviously, however, the prior art allows other embodiments as well.

The polyglycidyl ethers obtained according to the invention may be cured to shaped objects with the aid of the conventional curing agents, such as tertiary amines, primary and secondary polyamines, dicyanodiamide and polyamides. The use of anhydrides of polybasic carboxylic acids for this purpose is preferred, such as phthalic anhydride, pyromellitic anhydride and the like, in particular also anhydrides of cycloaliphatic dicarboxylic acids such as hexahydrophthalic anhydride and chlorendic anhydride.

EXAMPLES (a) To 282 g. (3 moles) of phenol and 49.5 g. of $BF_3$ phenolate dissolved in 1,000 ml. of carbon tetrachloride 49.5 g. (0.375 mole) of dicyclopentadiene dissolved in 400 ml. of carbon tetrachloride was added dropwise over a period of 20 minutes. During the addition, and for one hour afterwards the reaction mixture was kept at $-10°$ C., and then it was heated at 65° C. for a further hour. After cooling 300 g. of ice was added to the reaction mixture, whereupon a repeated water wash was applied to remove the catalyst. Subsequently, the carbon tetrachloride and the excess of phenol were distilled off under reduced pressure. The residue was treated with a 2% NaOH solution on a steam bath, whereby part of the residue passed into solution. The remainder was virtually soluble at 100° C. in 10% NaOH. From the resultant alkaline solutions the phenols were isolated by introducing $CO_2$, while cooling with ice. From the 2% NaOH solution 60 g. (50%) of product was obtained with a phenolic hydroxyl content of 620 meq./100 g. (expected from theory for the bisphenol, $n=0$, 625 meq./100 g.). From the 10% alkaline solution 31 g. (25%) of product was isolated with a phenolic hydroxyl content of 55 meq./100 g.

(b) The preparation of the polyglycidyl ether was conducted in a reaction vessel provided with a thermometer, stirrer, a device for the dropwise addition of an alkaline solution and a discharge line for vapor, to which a water condenser with a thermometer had been fitted, as well as vessel to receive and separate the condensate, which vessel was provided with a line for recycling the separate epichlorohydrin to the reaction vessel. The separator was also provided with a discharge line for the separated water. The reaction vessel was filled with 60 g. of the bisphenol, obtained by extraction with 2% NaOH solution according to example (a), and 255 g. of epichlorohydrin. The stirrer was put into operation and the solution of the bisphenol in epichlorohydrin heated to 105° C. at a pressure of 760 mm. Hg. Over a period of two hours 34 g. (2.5% excess) of a 45% NaOH solution was added dropwise at 105° C. During the reaction water and epichlorohydrin were distilled off from the reaction mixture. The condensed distillate was received and separated and the epichlorohydrin layer recycled to the reaction mixture. After all of the alkaline solution had been added, heating was continued for another 10 minutes in order to obtain complete removal of the water from the reaction mixture. After cooling the sodium chloride formed was filtered off, whereupon the unconverted epichlorohydrin was removed by distillation under reduced pressure (15 mm. Hg). For this distillation the bottom temperature was raised to 120° C. The residue was dissolved in 130 g. of toluene, whereupon this solution was stirred for one hour at 85° C. with an equal volume of a 5% aqueous NaOH solution. After separation of the aqueous caustic the solution was rewashed with an equal volume of a 4% solution of disodium phosphate for 15 minutes at 65° C. After removal of the water layer and after drying of the organic phase the toluene was removed by distillation under reduced pressure. The product consisted of 45 g. of a light-colored polyglycidyl ether with a softening point between 50 and 60° C., an epoxy number of 243 (grams of polyglycidyl ether per epoxy gram equivalent) and a saponifiable chlorine content of 0.2%.

(c) From this polyglycidyl ether 1.5–2 mm. thick plates were molded with the aid of 60 phr. (parts per hundred parts of polyglycidyl ether) hexahydrophthalic anhydride and 0.5 phr. alpha-methylbenzyldimethylamine (composition C1). The plates were cured for 16 hours at 140° C. For comparison plates were prepared in the same way from a liquid epoxy resin based on bisphenol-A with an epoxy number of 195, 77 phr. hexahydrophthalic anhydride and 0.5 phr. alpha-methylbenzyldimethylamine (composition C2), and a solid epoxy resin based on bisphenol-A with an epoxy number of 425 and a softening point of from 40 to 50° C. and 31 phr. hexahydrophthalic anhydride (composition C3). Subsequently, the Barcol hardness, the softening point and some electrical properties of the plates obtained were determined. The results have been included in the table below.

TABLE I

| | Plates from composition | | |
|---|---|---|---|
| | C1 (according to invention) | C2 (comparison) | C3 (comparison) |
| Barcol hardness | 37 | 37 | 32 |
| Vicat softening point, ° C. at a penetration of: | | | |
| 0.1 mm | 134 | 125 | 95 |
| 0.2 mm | 140 | 128 | 100 |
| 0.5 mm | 144 | 134 | 104 |
| 1.0 mm | 148 | 141 | 107 |
| Tracking resistance | T5 | T5 | T4 |
| Surface carbonization | Moderate | Strong | Strong |

The tracking resistance was determined by fitting two electrodes with a potential difference of 380 v. on the plates at an interval of 4 mm. (according to VDE specification 0303–I/9.64); subsequently, the number of droplets of 0.1% $NH_4Cl$ solution—one droplet per 30 seconds—determined with cause short-circuiting and erosion more than 1 mm. deep on the plates. The classification employed is as follows:

T1 = 1–3 droplets
T2 = 4–10 droplets
T3 = 11–30 droplets
T4 = 31–100 droplets
T5 = >100 droplets The extent of surface carbonization was determined visually; a strong surface carbonization points to a low tracking resistance.

(d) Plates manufatured from compositions C1 and C3 were placed in various solvents to determine their solvent resistance, expressed in percentage of weight increase after different periods:

TABLE II

| | Plates from composition | |
|---|---|---|
| | C1 (according to invention) | C3 (for comparison) |
| Weight increase, percent, in: | | |
| Water, after 10 days | 0.3 | 0.55 |
| Water, after 20 days | 0.4 | 0.7 |
| Water, after 40 days | 0.5 | 0.9 |
| 20% NaOH, after 10 days | 0.2 | 0.35 |
| 20% NaOH, after 20 days | 0.25 | 0.45 |
| 20% NaOH, after 40 days | 0.3 | 0.55 |
| Benzene, after 10 days | 0.05 | 0.1 |
| Benzene, after 20 days | 0.075 | 0.15 |
| Benzene, after 40 days | 0.1 | 0.2 |
| Methyl ethyl ketone, after 10 days | 0.6 | 5.8 |
| Methyl ethyl ketone, after 20 days | 1.2 | 11.4 |
| Methyl ethyl ketone, after 40 days | 2.3 | |

Immersion experiments in 5% acetic acid, 2½% sulfuric acid and 2% NaOH gave about the same results as the test in water.

From the examples (c) and (d) it appears that in addition to improved electrical properties the products according to the invention also possess a better resistance against aggressive media.

We claim as our invention:
1. A curable polyglycidyl ether prepared by:
   (1) reacting (a) from 1.5 to 15 moles of a mononuclear phenol possessing at least one free ortho- and/or para-position relative to a phenolic hydroxyl group with (b) 1.0 mole of dicyclopentadiene and then

(2) etherifying the resulting polyphenol by reacting same with at least 1 mole of epichlorohydrin per phenolic hydroxyl equivalent in an alkaline medium.

2. A polyglycidyl ether as in claim 1 wherein the mono-nuclear phenol is selected from the group consisting of phenol, cresols, dimethylphenols and resorcinol.

3. A polyglycidyl ether as in claim 1 wherein the mono-nuclear phenol is phenol.

4. A polyglycidyl ether as in claim 1 wherein from 0.2 to 40% by weight, based on the mono-nuclear phenol, of a $BF_3$-complex is used as a catalyst to prepare the polyphenol.

References Cited

UNITED STATES PATENTS 3,121,727  2/1964  Baliker et al. _____ 260—348.6

FOREIGN PATENTS 969,674  9/1964  Great Britain.
1,364,247  5/1964  France.

NORMA S. MILESTONE, Primary Examiner

U.S. Cl. X.R.

260—47, 348